(12) United States Patent
Hirschberg

(10) Patent No.: US 10,533,807 B2
(45) Date of Patent: Jan. 14, 2020

(54) THREE-DIMENSIONAL MOULDING

(71) Applicant: HIRSCHBERG ENGINEERING, Winterthur (CH)

(72) Inventor: Sebastian Hirschberg, Winterthur (CH)

(73) Assignee: HIRSCHBERG ENGINEERING, Winterthur (CH)

(*) Notice: Subject to any disclaimer, the term of this patent is extended or adjusted under 35 U.S.C. 154(b) by 817 days.

(21) Appl. No.: 14/430,167

(22) PCT Filed: Sep. 19, 2013

(86) PCT No.: PCT/CH2013/000166
§ 371 (c)(1),
(2) Date: Mar. 20, 2015

(87) PCT Pub. No.: WO2014/043823
PCT Pub. Date: Mar. 27, 2014

(65) Prior Publication Data
US 2015/0246484 A1    Sep. 3, 2015

(30) Foreign Application Priority Data

Sep. 21, 2012  (EP) .................................... 12405104

(51) Int. Cl.
*F28D 20/00*    (2006.01)
*B01F 5/00*    (2006.01)
(Continued)

(52) U.S. Cl.
CPC ............ *F28D 20/00* (2013.01); *B01F 5/0602* (2013.01); *B33Y 10/00* (2014.12); *B33Y 80/00* (2014.12); *Y10T 428/24752* (2015.01)

(58) Field of Classification Search
CPC ....... B01F 5/0602; F28D 20/00; B33Y 10/00; Y10T 428/24752
(Continued)

(56) References Cited

U.S. PATENT DOCUMENTS 5,714,103 A    2/1998  Bauer et al.
2002/0026998 A1*  3/2002  Paulman ................. F28F 1/128
165/153
(Continued)

FOREIGN PATENT DOCUMENTS

CH           642 564 A5    4/1984
DE    10 2004 034 269 A1    2/2006
(Continued)

*Primary Examiner* — Anshu Bhatia
(74) *Attorney, Agent, or Firm* — Birch, Stewart, Kolasch & Birch, LLP

(57) ABSTRACT

One aspect of the invention relates to a molding which is flow-passable by a fluid in at least one flow direction. The molding comprises a multiplicity of mutually parallel successive layers. Each layer includes clearances and at least one mating face toward a following or a preceding layer. Each clearance of one layer overlaps at least one region of the clearance of a following or preceding layer. On account thereof, the layers collectively configure step-shaped webs in the molding. The molding comprises at least two such webs. Moreover, the present invention relates to manufacturing methods for manufacturing said moldings, and the use of said moldings and reactors which comprise said moldings.

17 Claims, 13 Drawing Sheets

(51) Int. Cl.
    *B01F 5/06*        (2006.01)
    *B33Y 10/00*        (2015.01)
    *B33Y 80/00*        (2015.01)

(58) Field of Classification Search
    USPC ........................................................ 366/336
    See application file for complete search history.

(56)            References Cited

U.S. PATENT DOCUMENTS

| 2004/0170459 | A1  |  9/2004 | Taylor et al. |
| 2004/0238052 | A1  | 12/2004 | Karp et al. |
| 2005/0047274 | A1* |  3/2005 | Moser .................. B01F 5/0612 366/336 |
| 2011/0310697 | A1* | 12/2011 | Hirschberg .............. B01F 3/06 366/337 |
| 2012/0080113 | A1  |  4/2012 | Mascarello et al. |
| 2012/0218857 | A1  |  8/2012 | Ocola et al. |
| 2013/0301379 | A1* | 11/2013 | Neerincx ............. B01F 5/0644 366/340 |

FOREIGN PATENT DOCUMENTS

| DE | 10 2009 006 788 A1 |  8/2010 |
| EP |       1 134 020 A1 |  9/2001 |
| FR |       2 748 691 A1 | 11/1997 |
| GB |       2 061 746 A  |  5/1981 |
| WO |      WO 93/16865 A1 |  9/1993 |

\* cited by examiner

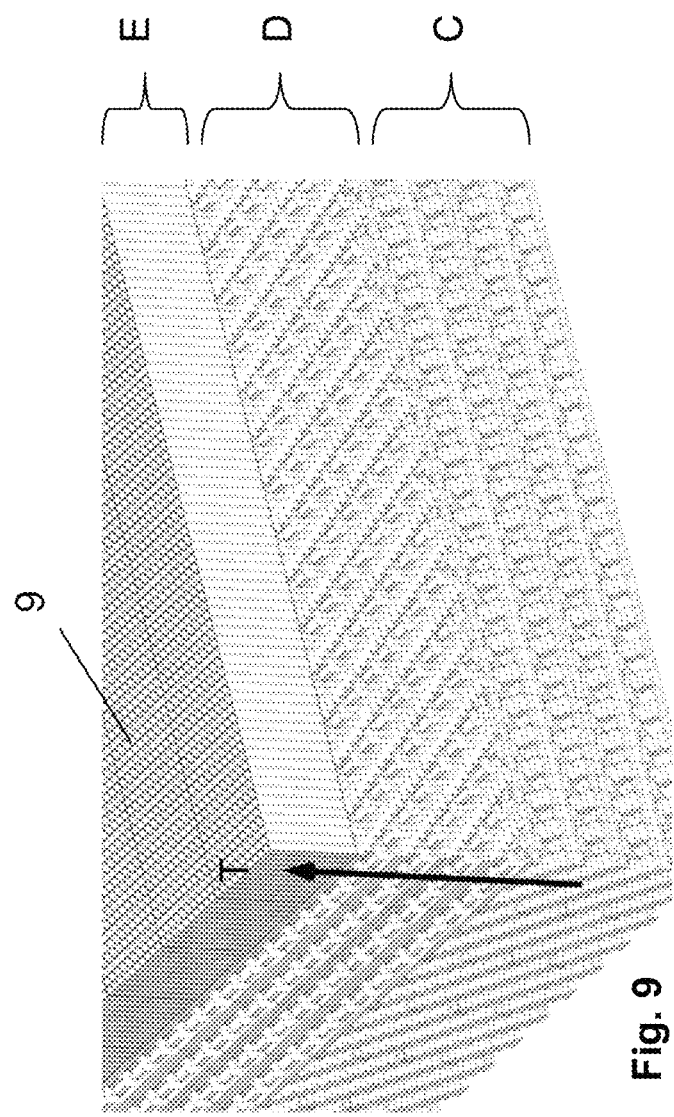

THREE-DIMENSIONAL MOULDING

TECHNICAL FIELD

The invention relates to moldings which are flow-passable by a fluid in at least one flow direction. Moreover, the present invention relates to methods for manufacturing such moldings, and the use of said moldings. In particular, the present invention relates to moldings, methods for manufacturing the same, and the use of moldings according to the preambles of the independent claims.

PRIOR ART

Fluid flows of various nature play an important part in very many processes of chemical engineering. For example, the flowing fluid may itself be the medium which is processed in the process, or the fluid serves for maintaining the temperature of the medium being processed, or for conveying the latter, for example. Reactions may take place in the flowing medium. For example, phase transformations may take place or be caused in the medium. Droplets may be split or coalesced in multi-phase flows. Fluids may be mixed or separated. Solids may be precipitated, etc.

It is a common feature of these fluidic processes that the plants have to be optimized in respect of flow control in order to achieve good degrees of efficiency of the processes. Here, depending on the application, various concepts have proven to be effective.

Static mixers have been employed in chemical engineering since the beginning of the 1970s for various, mainly continuous, processes dominated by flow. The type of mixer having webs disposed in an intersecting manner (CH642564) has been particularly successful here for applications in the lower to medium Reynolds number range. It is used in practice as a mixing element for installation in pipelines. Here, products having diameters between a few millimeters and several 100 mm, and with 4 to 8 webs across the pipe diameter are commercially available. Said static mixer is distinguished in that it functions reliably even in the case of manifold mixing tasks, even in the event of the viscosities of the fluids to be mixed being very varied, or in the case of very slow, creeping flows. Moreover, this mixer may also be employed for dispersing two immiscible liquids or a gas in a liquid. Furthermore, by employing mixing elements of this type in pipes, the heat transfer between the pipe and the flowing medium may be increased. This effect is particularly developed in the range of laminar Reynolds numbers, on account of which mixing elements of this type are employed above all in heat exchangers for highly viscous media. A further field of application are chemical processes having competing reactions running in parallel, in which as tight a dwell-time spectrum as possible is to be achieved in the fluid flowing through a tubular reactor. Here, the dwell-time spectrum can be considerably improved by installing static mixing elements in pipelines.

Micro mixers and micro reactors have been developed and also employed in practice for some years. Micro mixers and micro reactors are understood to be static mixers having ducts and mixing structures of which the dimensions are smaller than 1 mm. A very large number of various micro mixers and micro reactors exist, their architecture often having been adapted to the possibilities of production technologies for small structures of this type. On account of their small dimensions, they are distinguished by a very high surface-to-volume ratio and therefore allow for excellent temperature control. Moreover, using very small mixers and mixing ducts, very short mixing times can also be realized. Micro reactors and micro mixers above all have advantages where very small production lots have to be processed, where very much reaction heat has to be dissipated in an efficient manner, or where very hazardous materials are being handled and therefore the small dimensions and the accompanying small production volumes in the reactor represent a safety feature. However, scaling up laboratory experiments to the scale of pilot plants or even industrial production plants represents a problem in practice.

In industrial reactors in which reactions are carried out by means of heterogeneous catalysis, random beds of various random packings are often employed. Extruded pellets or variably shaped parts from metal or other materials are examples of random packings. These pellets here are either composed directly of a basic material which contains the catalyst required for the planned reaction in the desired amount, or they are impinged with a layer containing the required catalyst by means of various methods. By way of the size of the random packings and their shape, the flow resistance and the convective exchange and mixing of the fluid flowing through the reactor can be simultaneously influenced. The employment of random packings of this type in tubular reactors also leads to a tight dwell-time spectrum, which is of advantage in the case of some reactions. On account of the loose packing of the random packings, heat transmission is limited by heat conduction, which is why in practice heat transmission is mainly determined by the convective exchange or mixing of the flow in the reactor, respectively. Systems of this type are successfully employed in practice for large industrial reactors. The conception of the latter is typically limited by heat dissipation and mixing in the reactor. Pressure loss in reactions of this type is very high in some cases, such that the pump performance accounts for a relevant proportion of the process costs.

Since the 1990s various methods for manufacturing foam structures from various materials, such as metals, metal alloys, or ceramic, among others, have been developed. On the one hand, applications in lightweight construction are fields of application for metallic foams. On account of metallic foams employed in sandwich constructions, high strength, rigidity, and also potentials for absorbing energy by way of deformation in the event of crashes can be simultaneously achieved with low weight. Other important applications are to be found in modern batteries and fuel cells. On the other hand, flow-passed systems having particular properties can be produced by means of open-pore foams. Depending on the pore size and the proportion of dead volume, the foam has very good heat-conducting properties. In this way, heat exchanges and reactors having a high cooling or heating performance can be realized. However, the heat conductivity of a metal foam also depends on the web structure. Some manufacturing methods for open-pore metal foams produce foams having hollow webs, in which the webs are composed of only a thin shell. In comparison with structures having continuous metallic webs, this reduces heat conductivity. As is the case with random packings and also with the employment of static mixers, the dwell-time spectrum becomes considerably tighter in a tubular reactor filled with metal foam, which is of advantage in the case of some reactions (US 2012/008,011,3 A1). However, the convective flow exchange transversely to the main flow is also not very good in a metal foam and becomes worse at the same flow in the case of smaller pore sizes. Moreover, on account of the random arrangement of the pores in the metal foam it cannot be excluded that localized dead zones exist in the interior of the foam, or that individual pores in their size significantly deviate from the average.

In conclusion, therefore, liquid or gaseous media or multi-phase flows having liquid, gaseous, and solid components are continuously processed in different chemical engineering processes in that the former are pumped through tubular reactors or lines having moldings. It may be ensured by smart selection of the geometry of the moldings that these chemical engineering processes take place in a particularly efficient manner. It is important here that the moldings can be equally conceived and employed for very small production lots in laboratory and pilot plants, as well as for large industrial production plants, and that scaling up from the laboratory via the pilot plant to the large-scale industrial plant can be performed in a simple manner. Of course, it is at the same time also decisive that moldings of this type can be economically manufactured by means of efficient production methods.

DESCRIPTION OF THE INVENTION

It is an object of the invention to achieve a molding associated with the technical field mentioned at the outset, which is particularly efficient, can be manufactured in a cost-effective manner, and is employable in manifold ways. In particular, a cost-effective and efficient method for manufacturing a molding according to the invention is to be provided. Moreover, a particularly efficient use of the molding according to the invention is provided.

The achievement of the objective(s) is defined by the characterizing part of the independent claims.

One aspect of the invention relates to a molding which is flow-passable by a fluid in at least one flow direction. The molding comprises a multiplicity of mutually parallel successive layers. Each layer includes clearances and at least one mating face toward a following or preceding layer. Each clearance of one layer overlaps at least one region of the clearance of a following or preceding layer. On account thereof, the layers collectively configure step-shaped webs in the molding. The molding comprises at least two such webs.

The molding according to the invention can perform chemical engineering processes dominated by flow in a particularly efficient manner, for example. On account of its internal geometry, said molding may contain connected pore systems which are flow-passed by the fluids to be processed. In this manner, dead zones in which fluid is trapped can be efficiently avoided. Using the molding according to the invention, intensive large-scale transverse mixing can be achieved during flow passage in the interior, even in the case of very small dimensions of flow ducts. The geometry of the moldings according to the invention enables a large surface-to-volume ratio to be able to be realized, which is a further advantage, for example for heat transmission or for coated systems, for example for heterogeneous catalysis.

By way of the step-shaped webs according to the invention, high heat transfer between the webs and the fluid flowing therethrough, and also, depending on the material used, high heat conduction in the interior of the molding may be achieved. On account of the step shape of the webs, the specific surface of the webs is also increased, which may be of advantage for heat transfer as well as for heterogeneous catalytic reactions. Moreover, the specially conceived shape of the step-shaped webs may induce intensive intermixing of a flow transversely to the main flow. This intermixing may also occur in the case of very small localized Reynolds numbers, in which, for example, flows only display a very limited intermixing behavior transversely to the main flow, on account of random pore systems like those which exist in open-pore metal foams.

In the sense of the present invention a mating face exists when there is at least physical contact between the layers. This contact may range from only contact on the edge side up to a material overlap. However, the mating face, or the proportion of overlap in terms of surface area, respectively, preferably is between 5 to 95%, in particular between 5 and 50% of mutually facing layer surfaces. In the same way, the clearances may be viewed as a type of "negative image" of the layers, wherein the clearances of the following layers in each case overlap the preceding clearances to the same extent as the corresponding layers share a mating face on the side facing the following layer.

The at least one flow direction may be a sum of all flows through the molding, that is to say that the molding may be designed such that it includes at least one entry opening and at least one exit opening. In this case, the flow direction through the molding would be a vector in the axis from the at least one entry opening to the at least one exit opening. Therebetween, the molding may include an arbitrary number of deflections of the flow direction, these deflections being caused in particular by the design of the webs. The mating face is materially integral.

In the sense of the present invention a layer of a molding is to be understood to be a group of bodies in the same planar extent through the said molding. A layer may comprise a series of tiers. In this context, a successive layer is also to be understood as a layer which is in physical contact with said planar extent and which lies parallel therewith.

A fluid in the sense of the present invention may be envisaged to be any substance or mixture of substances which has fluid properties, that is to say which does not resist any arbitrarily slow shearing, in particular. In this sense, the term fluids comprises in particular gases, liquids, as well as solids or mixtures thereof which may display flow properties.

In the sense of the present application a multiplicity means a number of at least two.

A layer of a molding according to the invention may have a layer thickness which depends on the desired application. In an exemplary manner, the layer thickness may range from 20 to 30 µm, up to 10 mm. Layer thicknesses of between 100 and 900 µm are particularly preferable. A molding according to the invention may have external dimensions of between 1 mm and 2000 mm, in particular between 4 and 500 mm, in particular between 100 and 300 mm, in particular around 50 mm, likewise depending on the application.

In a particular embodiment, a molding according to the invention may be designed such that it may be constructed with a minimum of various successive two-dimensional structures, that is to say layers, a three-dimensional structure having the functional properties mentioned above.

A molding according to the invention may extend in three axes, an X-axis, a Y-axis, and a Z-axis. One of these axes of extent may correspond to the summary flow direction through the molding. In one particular embodiment the individual layers are formed in a planar extent which formed from two of the axes of extent, for example the X- and Y-axes, and a fraction of the entire extent in the Z-axis. This fraction of the entire extent in the Z-axis then forms a thickness of a layer.

In one particular embodiment a first layer comprising a planar extent which is formed by two axes of extent and a fraction of the entire extent in a third axis, is followed by a second layer which is disposed so as to be offset in such a manner in relation to the first layer that a surface of the first layer coming into contact with the second layer is overlapped by the latter. Alternatively, the second layer is disposed such that the second layer has at least one common edge with the first layer.

In one particular embodiment the at least two webs in the molding are designed in such a manner that they mutually intersect.

In one particular embodiment the molding includes a shrouding which runs parallel with the at least one flow direction, the shrouding is in particular an integral component part of the molding, and the entire molding is preferably configured as one part. Alternatively, the molding can subsequently be provided with a shrouding.

In one particular embodiment the molding is designed such that the webs are repeated at periodic intervals within the molding, that is to say that, for example, a web may run from one side of the shrouding to the other side of the shrouding, while a second reciprocal web, so to speak, runs exactly opposite thereto, that is to say extends from the side of the shrouding where the first web terminates to the side of the shrouding where the first web starts. Such an arrangement may be considered to be an interval. In the next interval, the first web would then extend from the side of the shrouding where the second web started in the first interval to the opposite side of the shrouding. Geometric patterns may thus recur periodically within the molding. The smallest pattern to be repeated for manufacturing a molding having specific pre-defined through-flow properties may be determined mathematically. This smallest possible determined pattern may be repeatedly present within the molding.

In the sense of the present invention an interval may be considered to be a specific succession of layers within a molding, an interval comprising in particular between 2 and 50, in particular 2 and 20 layers. Such intervals may also be disposed in parallel, that is to say that the repetition of the interval does not take place in the direction of a main flow direction, but in a radial manner thereto. In this way, a structure of arbitrary size may be realized from a molding having the smallest of intervals. Alternatively, the molding comprises a unique internal arrangement which is not repeated.

In one particular embodiment the intervals are designed such that the alignment of the webs is rotated at an angle of substantially 90° about the flow direction. In this manner a change in direction of the fluid can be accomplished. It is a particular advantage of this embodiment that the geometry of the moldings is designed such that a transversal dispersion does not depend on the localized Reynolds number, but is simply proportional to the mean spatial speed.

In one particular embodiment the entirety of the clearances forms a contiguous volume of the molding, the entirety of the clearances thus configuring a flow-passable interior volume of the molding. The clearances of a plurality of layers lying on top of one another may run like ducts along the interior webs of the molding. In this manner a molding may lead to efficient intermixing on account of numerous changes of direction of a fluid flowing therethrough. For example, in order to vary the convection flow induced by the step-shaped webs in one direction, the alignment of the step structure may be modified, preferably rotated, from time to time. Here, this may be rotation of the alignment of the step-shaped webs by 90° about the flow direction. For example, in the case of periodic rotation by in each case 90°, two alignments of the step-shaped webs in the molding result. A flow-passable interior volume then exists when the entirety of the clearances result in a contiguous interior volume. For example, there may be a contiguous labyrinth in the interior of the molding, which is flow-passable in ducts and is delimited by the webs. It goes without saying that such an exemplary labyrinth would be one which preferably has no dead ends, so as to avoid dead zones.

In one particular embodiment the layers run parallel with the at least one flow direction. Alternatively, the layers run perpendicularly to the at least one flow direction.

In one particular embodiment the shrouding comprises recesses and/or fins and/or ribs. These structures of the shrouding may serve for enlarging the surface for the purpose of heat exchange, for fixating or mounting the molding, or as inlets and outlets for additives. Rib structures on the external duct wall may be an integral component part of the respective layer. A double shroud which is disposed about the molding per se may likewise be directly connected to the layer structure. Alternatively, the shrouding includes no structures of this type. The structures may also be combined. In this manner, the shrouding may include recesses for inlet and outlet ducts, or fastenings, and simultaneously have a surface with fins for improved heat exchange. A shrouding may also have only one of the mentioned structures; for example, in this manner ribs may extend across the entire surface of the shrouding, parallel with the cross-sectional area of the molding, out of the shrouding. Such ribs impart stability to the molding and enlarge the surface of the shrouding. Furthermore, the ribs may be equipped with appendices or villi or bracings, in order to further enlarge the surface. By way of bracings, stability can additionally be improved. Such bracings may extend from rib to rib, for example. If the intermediate spaces between the ribs are completely braced, this may lead to a double-wall shrouding. A further fluid may then be circulated within the double wall. The listing of "and/or" in the sense of the present invention is used in the sense of a copulative conjunction.

In one particular embodiment the molding is designed as one part. A very high structural strength can be produced by way of the step-shaped webs which are fixedly connected to the shrouding. To this end, the shrouding is comparatively easy to design and material may be saved. Alternatively, the molding is of multi-part design. In one particular alternative embodiment the molding comprises a separate shrouding or sleeve, or comprises further sub-moldings, such that a comparatively large block of moldings, which is assembled from different or identical sub-moldings, exists. In one further alternative embodiment the molding comprises a separate shrouding which is fixedly connected to the remaining molding. In this manner, the shrouding may be welded, or adhesively bonded, or screwed to the molding, for example.

In the sense of the present invention, as one part is thus to be understood that the molding and the shrouding are from one part, that is to say integral.

In one particular embodiment the webs are designed such that they are intersected at an at angle, preferably at a substantially right angle, in relation to one another. A substantially right angle according to the invention may be an angle deviating from 90° by between approx. 1° and 15°.

In one particular embodiment the molding comprises at least one periodic interval from between 2 and 50, in particular 2 and 20 layers, in particular between 2 and 15 layers, in particular between 2 and 6 layers.

In one particular embodiment the molding has a cross section in a sectional plane which is perpendicular to the flow direction. In a further particular embodiment the sectional plane is in a planar extent which is composed of two of the axes of extent, preferably the extent of the X- and Y-axes. In one further particular embodiment the cross section is rectangular, square, or round. Step webs having an alignment which is parallel with the sectional planes can be realized in the case of square or rectangular structural cross sections. An almost but not completely smooth web surface results in the case of very many short successive steps. This has the advantage that pressure loss in a fluid flowing therethrough is reduced.

In one preferred embodiment the molding is substantially from a material selected from the group composed of steel alloys, metals or metal alloys, ceramic, glass, plastic materials, or other materials.

In one further preferred embodiment the surface of the molding, in particular the surface delimiting the flow-passable interior volume, is coated. Above all, coatings which improve temperature exchange, non-stick coatings, or coatings which may serve as a catalyst for the fluids or component parts thereof, may be employed here. In one further particular embodiment the surface which delimits the flow-passable interior volume may be coated with another functional or active layer, for example with anti-bacterial layers. Alternatively, the molding is uncoated.

In one particular embodiment the molding comprises one outlet point and one inlet point. In one further preferred embodiment these points include functional structures, such as deflection zones, pressure build-up zones, pressure deflation zones, or particularly coated, catalytic zones, for example. In one particularly preferred embodiment these points are an integral component part of the molding. In one further particular embodiment the molding comprises a layer of parallel ducts at one or both of the above-mentioned points, wherein the ducts may have round, elliptic, honeycomb-shaped, rectangular, square, or polygonal cross sections, for example.

In one particular embodiment the molding according to the invention is obtainable by way of a method which comprises the following steps. A plastically deformable compound is applied through a template to form a first layer, wherein the template has recesses through which the plastically deformable compound reaches a substrate. Subsequently, the first layer is optionally cured. Subsequently, onto the first layer a number of following layers is applied through in each case one template onto this first layer, wherein the following layers may be optionally cured prior to applying the next layer. The templates here are designed such that the following layer includes at least one mating face toward the preceding layer, as explained above, such that an altogether step-shaped structure is created. Preferably between two and fifty, particularly preferably twenty layers are applied. Each layer is applied through a matching assigned template. In the case of comparatively thick layers, repeated individual tiers which, optionally cured in the meantime, ultimately form one layer may be applied through the same template. Curing the plastically deformable compound may comprise a drying step; alternatively, curing may also comprise a UV-curing step, a chemical curing step, or an otherwise induced curing step. The molding obtained may subsequently be solidified; in particular, the molding obtained may be solidified by heating, in particular be sintered.

In the sense of the present invention a template may be designed as a screen or mask, comprising recesses which correspond to a topography of a layer of the molding.

In one particular embodiment the molding is designed such that it can be produced by way of a mass-production method. In particular, the structure of the molding is designed such that it may be constructed from a large number of two-dimensional layers so as to form one three-dimensional molding, wherein preferably the two-dimensional structures involved in terms of their geometry are repeated and should include as few different two-dimensional profiles as possible. One profile may serve for manufacturing one layer, for example. A plurality of tiers may be applied through a profile and collectively form said layer. Such a profile may be used as a template for a manufacturing method according to the invention, as is narrated in the further course of the description of the invention.

In one particular embodiment of the present invention an interior volume of the molding defined by the clearances, in particular the flow-passable interior volume of the molding, is filled with a phase-change material. Particularly preferably, the entire interior volume of the molding is filled with a phase-change material. A phase-change material in the sense of the present invention is a material which within a defined temperature range can store heat or cold by way of latent fusion heat. Materials which by exploitation of the heat content of thermodynamic state transformations can store latent heat are particularly suited. The phase-change material is preferably a material which utilizes a solid-to-liquid, or liquid-to-solid phase change, respectively, for releasing heat content. Examples of suitable phase-change materials are paraffin waxes based on paraffin.

In one further particular embodiment the molding is composed of a material having a relatively high thermal conductivity, for example having a thermal conductivity of more than 20 W/(mK), particularly preferably a thermal conductivity of more than 100 W/(mK).

In one further particular embodiment the molding is encapsulated, that is to say that the molding is sealed in such a manner that the flow-passable interior volume no longer has a fluid communication with an external volume of the molding. In this particular embodiment substantially the entire, preferably the entire interior volume is filled with a material, in particular a phase-change material as narrated above. For example, on account of a high thermal conductivity of the molding material, such a molding can introduce heat or cold in a particularly efficient manner into an encapsulated phase-change material which would otherwise dispose of a comparatively poor thermal conductivity. In one further particularly preferred embodiment the molding is encapsulated by a membrane, such that a potential change in the volume of an encapsulated material, for example a phase-change material, taking place on account of a phase change can be absorbed. On account of such an arrangement, a phase-change material cannot escape, even in the liquid phase.

A further aspect of the present invention relates to a composite molding. A composite molding comprises a plurality of moldings as narrated above, which are disposed in the composite. For example, the moldings may be disposed such that a common flow-passable interior volume is formed. They may also be disposed such that they form interior volumes which are in each case not in fluid communication with one another. In one particular embodiment of the present invention the composite molding comprises a plurality, that is to say at least two, encapsulated moldings having a phase-change material as narrated above.

A further aspect of the present invention relates to a reactor comprising at least one of the moldings according to the invention. The reactor may be used for performing a multiplicity of chemical or physical reactions on a fluid. The reactor according to the invention in particular is a reactor for mixing, for example as a static mixer, for heat exchange, for emulsifying, for foaming, for performing catalyzed chemical reactions, for decontaminating, for vaporizing, for condensing, for precipitating materials, substances, or component parts. The molding also contributes toward the strength of the reactor if, as in one particular embodiment, the wall is produced so as to be directly connected to the molding. Reactors which employ moldings of this type, having integrated walls, can also be operated at comparatively high pressures, without very thick walls having to be employed to this end. On account of the same molding structure being able to be used in reactors having various diameters, by way of moldings of this type the practically identical process, together with suitable preliminary distributors, can be realized in a laboratory scale as well as in the industrial scale, and scaling up is performed in a comparatively easy manner in many cases.

In one particular embodiment the reactor comprises moldings together with suitable distributors which, for example, subdivide small additive fluid flows into partial flows which are then dosed into a main flow at various points which are uniformly distributed across the molding. On account thereof, the mixing duct and also the mixing time can be substantially reduced.

A further aspect of the present invention relates to the use of a molding according to the invention, in particular a molding which is flow-passable by a fluid in at least one flow direction. In particular, the present invention relates to the use of a molding according to the invention for mixing, for example as a static mixer, for heat exchange, for emulsifying, for foaming, for performing catalyzed chemical reactions, for decontaminating, for vaporizing, for condensing, for precipitating or diffusing materials, substances, or component parts. The specially conceived shape of the step-shaped webs may induce intensive intermixing of the flow transversely to the main flow. This intermixing may also occur in the case of very small localized Reynolds numbers, in the case of which flows through random pore systems, such as are present in open-pore metal foams, have an only very limited intermixing behavior transversely to the main flow. At the same time, a very large inner surface can be made available to the flow. On account thereof, a very efficient heat exchange between the molding and the flow is possible. Moreover, the heat can then be dissipated in an efficient manner in the interior of the molding. Since the molding can be constructed having a wall or shrouding which is directly connected in a metallic manner, the heat may also be dissipated in an efficient manner through the walls. At the same time, convective heat transmission through the flow is efficient on account of the intensive cross exchange.

In one particular embodiment the molding is used for mixing a plurality of fluid flows.

In one particular embodiment the molding is used for heating or cooling fluid flows by means of heat supply or heat discharge through a shrouding, or by means of mixing a plurality of flows having various temperatures.

In one particular embodiment the molding, for producing large defined surfaces in multi-phase flows by way of producing droplets having defined, tight droplet-size specters, is used in systems having a plurality of immiscible fluids or bubbles in the case of gas-liquid mixtures.

In one particular embodiment the molding is used for emulsifying systems having a plurality of immiscible fluids to form stable emulsions having very small droplets in the micrometer range.

In one particular embodiment the molding is used for producing stable foams from gaseous-liquid mixtures.

In one particular embodiment the molding is used for performing homogeneous chemical reactions in a controlled manner, while simultaneously intermixing the reacting flows and the heat supply and discharge in an intensive manner.

In one particular embodiment the molding is used for performing chemical reactions with heterogeneous catalysis by way of catalysts which are integrated in the molding or with which the moldings are coated. The comparatively large surface of the flow-passable interior volume of the molding according to the invention also aids in accelerating heterogeneous chemical reactions with catalysts on the surfaces. At the same time, the intensive intermixing of the flow in the interior of the molding may prevent the formation of hotspots or misdistributions of flow.

In one particular embodiment the molding is used for decontaminating fluids which are polluted by bacteria by way of contact with antibacterial coatings on the surface of the moldings. In this application of the moldings for decontaminating fluid flows which are polluted by bacteria, the combination of a very large surface for contacting the bacteria with an antibacterial coating, as well as the simultaneous intensive intermixing of the flow which leads to the entire fluid flow repeatedly coming into contact with the antibacterial surfaces in an intensive manner, is advantageous.

In one particular embodiment the molding is used for evaporating a liquid on the surface of the molding by way of heat input into the molding or by way of contact with a hot gas flowing through molding.

In one particular embodiment the molding is used for condensing a gas on the surface of the moldings by way of heat discharge through the moldings.

In one particular embodiment the molding is used for precipitation by way of crystallization during flow-passage through the moldings by precisely controlled cooling.

In one particular embodiment the molding is used for exchanging mass between a gas flow and a liquid, which flow-pass through the moldings together.

In one particular embodiment the molding is used for exchanging mass between two or more substantially immiscible liquids which flow-pass through the molding together. In the sense of the present invention, substantially immiscible liquids are such liquid pairings which in their liquid state do not form homogeneous solutions, preferably liquids which in their respective states cannot include more than 0.5 mole percent of the other phase. The liquids may form an emulsion in the molding. Such a use is particularly advantageous for extraction processes.

A further aspect of the present invention relates to a method for manufacturing a molding according to the invention. In order to carry out the method for manufacturing a molding, in particular a molding as described above, a template having recesses is provided. A plastically deformable compound is applied through the template to form a first layer, wherein the plastically deformable compound reaches a substrate through the recesses of the template. A second template is provided. A following layer of the plastically deformable compound is applied onto the first layer through the second template. The second template is designed in such a manner that the following layer includes at least one mating face toward the preceding layer.

The application of a following layer is repeated until the desired number of layers has been reached. For each layer a matching associated template is provided. Each layer is applied through the matching layer.

The molding is finally solidified, in particular by heating, in particular by sintering.

In one particular embodiment the first layer is cured after application. In particular, the following layers are cured prior to application of a possible next layer. Curing advantageously comprises a drying step. A curing step which comprises inter alia also a chemically induced curing reaction, a curing reaction induced by UV or other radiation, is also conceivable.

In one particular embodiment between two and twenty layers are applied, in particular between two and fifteen layers are applied, in particular between three and ten layers are applied. The number of layers stated is the number of unique, that is to say different layers. In a finished molding according to the invention, repetition of this method step may lead to a number of periodically recurring intervals.

In one particular embodiment a shrouding of the plastically deformable material is applied in addition to the layers. The shrouding may be applied simultaneously. In particular, the templates may be designed such that they include clearances for a shrouding. In one further particular embodiment the templates are designed such that possible structures on the shrouding, such as, for example, ribs, fins, webs, or openings may likewise be simultaneously applied. In this manner, a corresponding shrouding or a shrouding having a structure may be co-applied together with each layer. This reduces the number of operational steps required and renders the method particularly efficient. Moreover, on account thereof, it is also possible for the molding to be configured as one part. By way of the manufacturing method described, walls, ribs, and mounting devices, such as bores or slots, can also be additionally integrated in a direct manner in the molding, on account of which very economical mass production is enabled.

In one particular embodiment, repeated individual tiers which ultimately form one individual layer are applied through the same template.

In one particular embodiment the molding is solidified in the sintering furnace. Here, in a first step, evaporation of binders takes place at a comparatively low temperature of typically around 600° C. Thereafter, the molding is sintered at increased temperatures. The temperatures here always remain below the melting temperature, but are sufficiently high for particles in the plastically deformable compound to fixedly connect by way of diffusion processes. The sintering temperature typically moves between 1000-1350° C., in particular 1100-1300° C. for steel mixtures, wherein temperatures of 1200-2500° C., in particular 1400-1800° C., may be used for ceramics. The sintering conditions depend on the materials and are at the discretion of a person skilled in the art.

In particular, suspensions of which the main component may be fine-grained powder of the material to be employed may be used as the plastically deformable compound. A multiplicity of materials may be used; particularly suitable are metals, metal alloys, stainless steel, or precious metals, as well as ceramics and/or vitreous ceramics. The powders used typically have very small grain sizes of about 10 micrometers. Organic binders, in particular, are added in order to form a plastically deformable material. Materials which may be used as, for example, organic binders are inter alia CMC (carboxymethylcellulose), polyolefin, and various forms of natural starch (corn flour, wheat flour, potato flour, rice flour, etc.). In the event of the powders being water-compatible, an aqueous suspension having the powder to be processed and the organic binders may be generated. If the powders used are water-incompatible, solvents may be used instead of water.

In one particular embodiment, more than one material is used as the plastically deformable compound. A molding manufactured in such a manner comprises a composite of at least two materials and is configured as one part, since the structures manufactured from various plastically deformable compounds are bonded to one another in a form-fitting manner. Using this method, a composite molding having various catalytic zones may be manufactured. For example, a stable support structure may be formed using a first plastically deformable compound, while a catalytically active surface structure may be formed using a second plastically deformable compound. Alternatively, retrospectively releasable support structures which can be released or otherwise removed after curing or sintering, respectively, of a first plastically deformable compound may be formed, such that a structure which would otherwise be too delicate or unstable to manufacture (for example, a structure in which the individual successive layers are only in contact with one another by the edges) is manufacturable in a reliable manner.

A further aspect of the present invention is the use of the narrated molding as a thermally conductive structure in a composite molding which is filled with a phase-change material. Depending on the application purpose of the composite molding, a phase-change material having a specific temperature range is selected, this being within the competence of the corresponding person skilled in the art. Such composite moldings would inter alia be suitable as heat accumulators in thermal solar installations. The molding would then be conceived such that it displays optimal heat transfer from its inner face to a phase-change material which is enclosed in the interior volume of said molding. A particular efficient heat transmission, both from the phase-change material as well as in the opposite direction, is ensured with the high surface-to-volume ratio of the moldings according to the invention.

For this application, the molding is filled with the phase-change material and subsequently encapsulated by a membrane.

All particular embodiments can be combined with one another in any arbitrary manner in the scope of the present invention.

Further advantageous embodiments and combinations of features of the invention are derived from the following detailed description and the entirety of the patent claims.

BRIEF DESCRIPTION OF THE DRAWINGS

In the drawings used for explaining the exemplary embodiment:

FIG. 9 schematically shows a further embodiment of a molding according to the invention, having a different alignment of the layers in relation to the main flow axis and a functional zone;

FIG. 12b schematically shows a template which may be used for applying a following second layer onto the template of FIG. 12a.

In principle, same parts are provided with same reference signs in the figures.

WAYS OF IMPLEMENTING THE INVENTION

Figure 1:
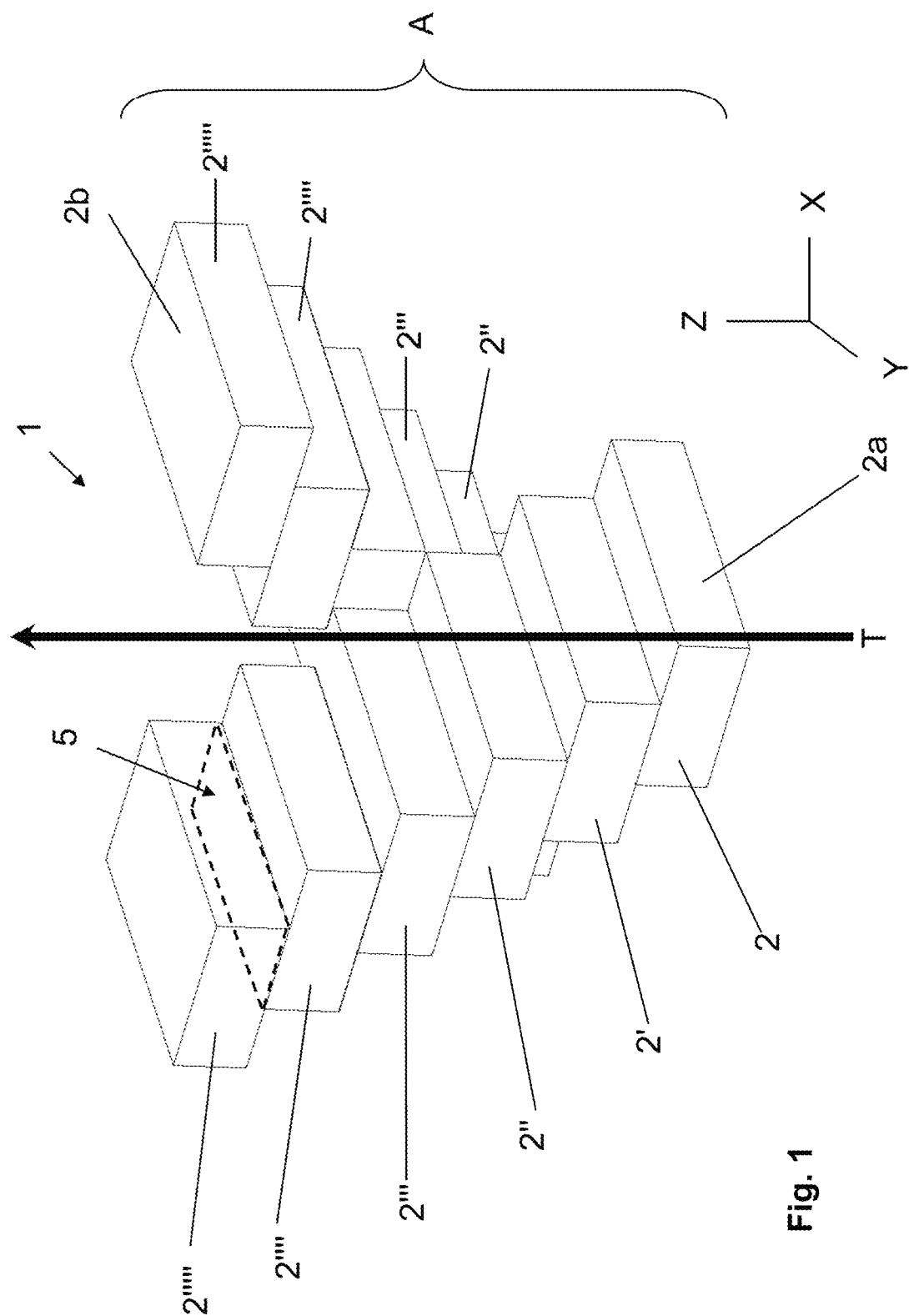
FIG. 1 schematically shows a potential basic structure of a molding according to the invention, having six layers.

FIG. 1 shows a schematic illustration of a simple basic structure of a molding 1 according to the present invention. The molding 1 has two webs 2a, 2b. The first web 2a runs from bottom right to top left, while the second web 2b runs from bottom left to top right and is disposed in the plane which is behind the first web 2a. The general flow direction T runs from bottom to top. The classification of bottom/top was selected arbitrarily, serves only for explaining the figure, and has no functional context in relation to the molding. The general flow direction T indicates that a fluid which flow-passes through the molding 1 in the present example has a first contact with the molding 1 at the lower end, the entry end 10 of the molding 1, and exits from said molding again at the upper end of the molding 1, at the exit end 11. The webs 2a, 2b are formed by a multiplicity of layers 2, 2', 2'', 2''', 2'''', 2''''', which impart an overall step-shaped structure to the webs 2a, 2b. Here, a first layer 2 is partially overlapped by a second layer 2' which in turn is partially overlapped by a third layer 2''. The degree of overlap, that is to say, for example, the proportion of area of a step of the first layer 2 which is materially integral with the proportion of area of the second layer 2', in the present example is constant throughout the molding 1. The individual layers 2, 2', 2'', 2''', 2'''', 2''''', form both the steps of the first web 2a as well as of the second web 2b. In the present example, the degree of overlap is approx. 50%, that is to say that 50% of the surface of a layer which is perpendicular to the main flow direction is in materially integral contact with a neighboring layer. Moreover, in the present example the thickness of the layer, that is to say the areas which are parallel with the main flow direction T, corresponds to the area remaining free, which is not overlapped by the following layer. The in each case overlapping proportions of area of a layer form a mating face 5. The mating face 5 in the finished molding 1 is connected in a materially integral manner.

Described by example of the layer 2'''' of the webs 2a, 2b, this means that both steps which lie in the layer 2'''' or the area extent of the extent axes X, Y, form a common layer. Clearances 12 are between the steps of the webs 2a, 2b, in the layer 2''''. The webs 2a, 2b, which are shown in an exemplary manner, run opposite to one another and mutually intersect at an angle of 90°, calculated from a respective imaginary central axis through all edges of the steps of a web 2a, 2b.

The molding 1 shown in FIG. 1 may also be manufactured as a multiple, wherein a larger molding 1 having more webs 2a, 2b is produced. Such an element may be repeated arbitrarily, for example as interval A, also in another basic alignment, in order to produce in this way a larger molding 1. The layer thicknesses of the layers 2, 2', 2'', 2''', 2'''', 2''''' shown in an exemplary manner in FIG. 1 may move between 30 μm and 10 mm. The present example has layer thicknesses of the layers 2, 2', 2'', 2''', 2'''', 2''''', of 500 μm.

Figure 2:
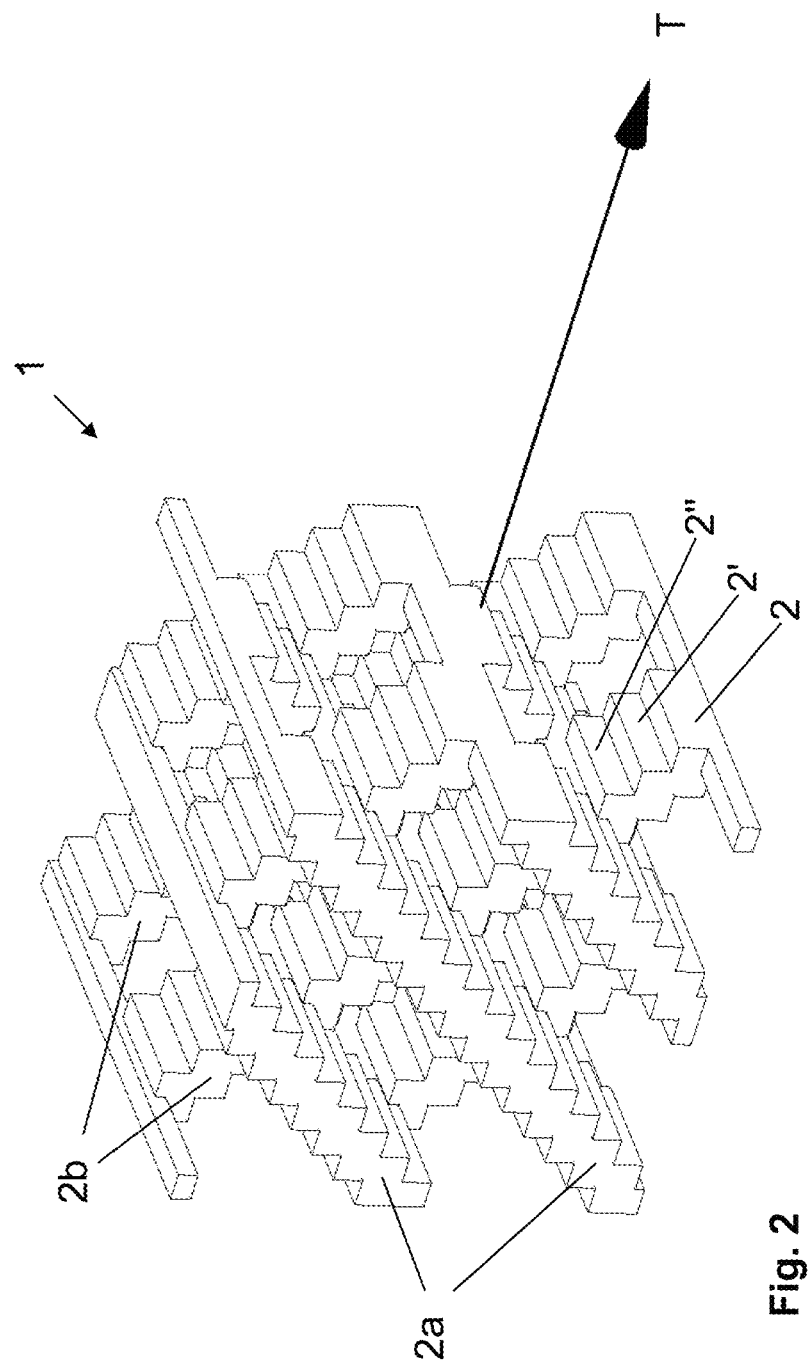
FIG. 2 schematically shows a molding according to the invention.

Such a larger molding 1 is shown in FIG. 2, for example. This molding 1 may be manufactured from silver, for example, by a method which is analogous to the one described in the case of FIG. 1. The molding 1 has a 3D-structure having intersecting, step-shaped webs 2a, 2b, wherein the layers 2, 2', 2'' are aligned so as to be perpendicular to the main flow direction T. On account of the good thermal properties of silver and the large surface by way of the webs 2a, 2b, the molding shown in FIG. 2 can be ideally employed as a heat exchanger. In total three webs 2a and three webs 2b are disposed so as to be cruciform in relation to one another in the molding 1. The individual webs 2a, 2b, depending on their extent, dispose of a different number of steps, but the molding 1 has fifteen layers 2, 2', 2'' in total.

The molding 1 shown in FIG. 2 may have external dimensions of between 1 and 10 mm, for example.

Figure 3:
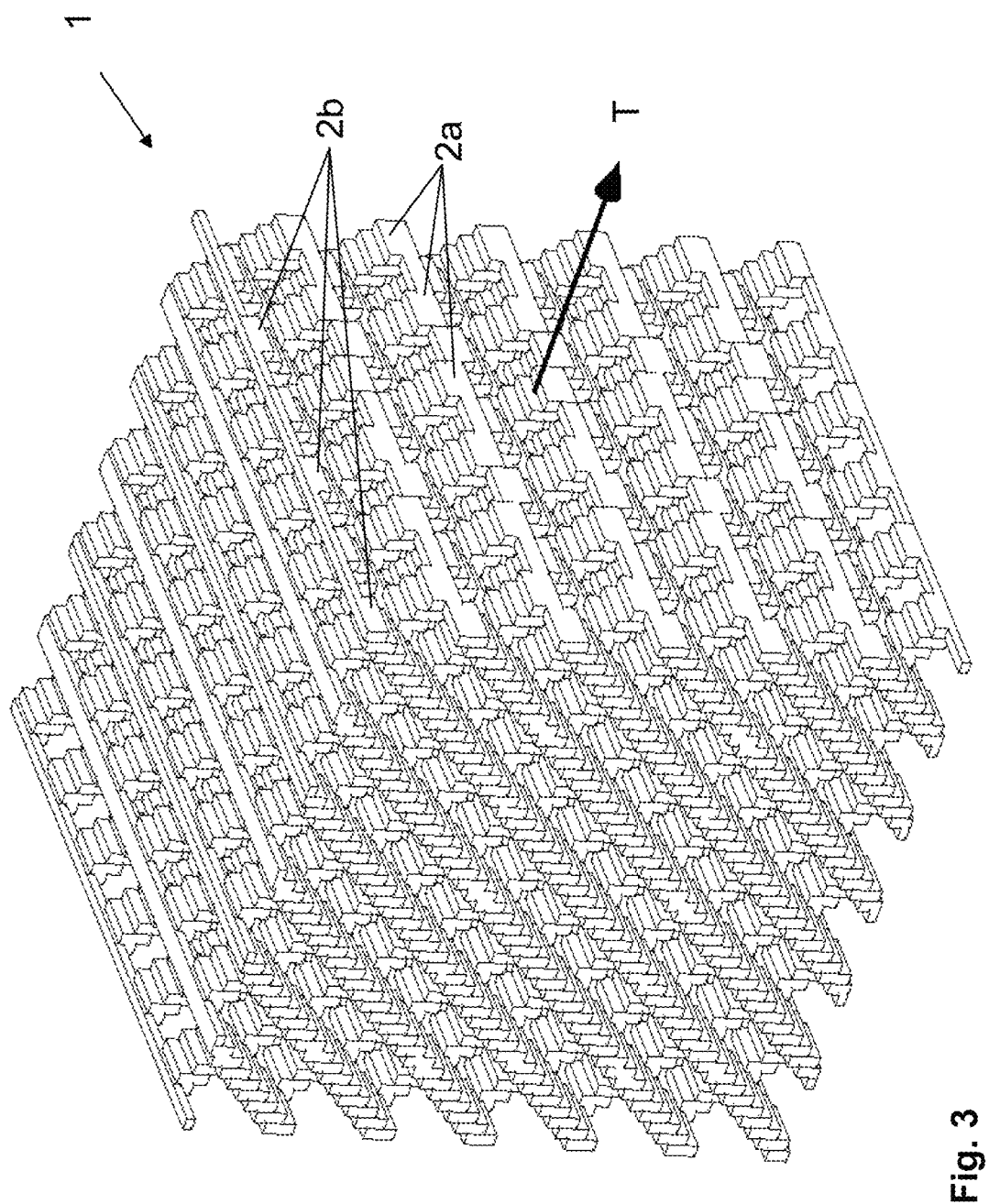
FIG. 3 schematically shows a further embodiment of a molding according to the invention, having a large surface and a rectangular profile.

A larger block having a square footprint of the 3D-structure with intersecting, step-shaped webs 2a, 2b is shown by example in FIG. 3. Here too, the layers are aligned so as to be perpendicular to the main flow direction T. This block disposes of a particularly large surface in relation to the volume. In this manner, this block according to the invention would be particularly suitable as a reactor. In the present example the molding 1 could be provided with a catalytically active covering. On account of the large surface, a catalyst can react in an optimal manner with a fluid in the interior volume of the molding 1.

The molding 1 shown in FIG. 3 may have external dimensions of between 3 and 30 mm, for example.

Figure 4:
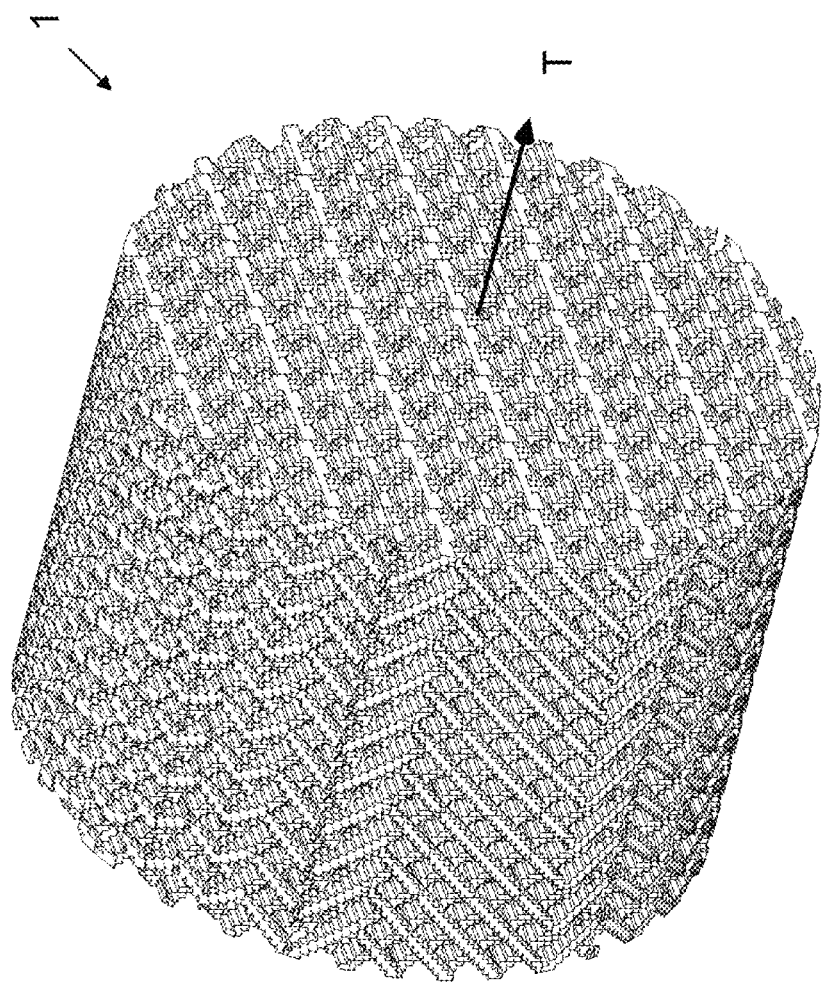
FIG. 4 schematically shows a further embodiment of a molding according to the invention, having a round profile.

FIG. 4 shows an example of a larger block having a round footprint. The layers are aligned so as to be perpendicular to the main flow direction T. The round footprint may be established in various ways. For example, a molding 1 as shown in FIG. 3, having a rectangular cross section, may be milled or cut to any shape, including a round shape. However, the round cross section may also be provided from the outset in the manufacture of the molding, in that the outer peripheries of the layers are in each case rounded. In this molding, the layers run perpendicularly to the main flow direction T, while the webs run at an angle of 45° to the main flow direction.

Figure 5:
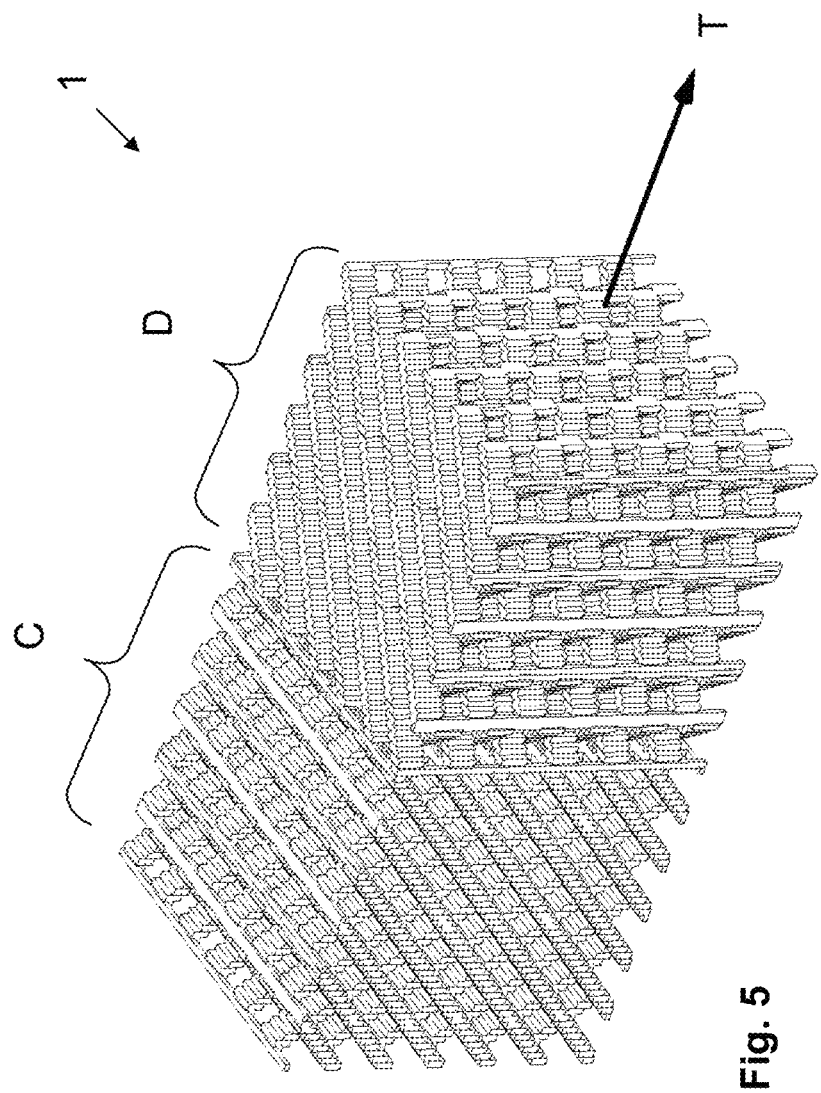
FIG. 5 schematically shows a further embodiment of a molding according to the invention, having a different alignment of the layers in relation to the main flow axis.
Figure 6:
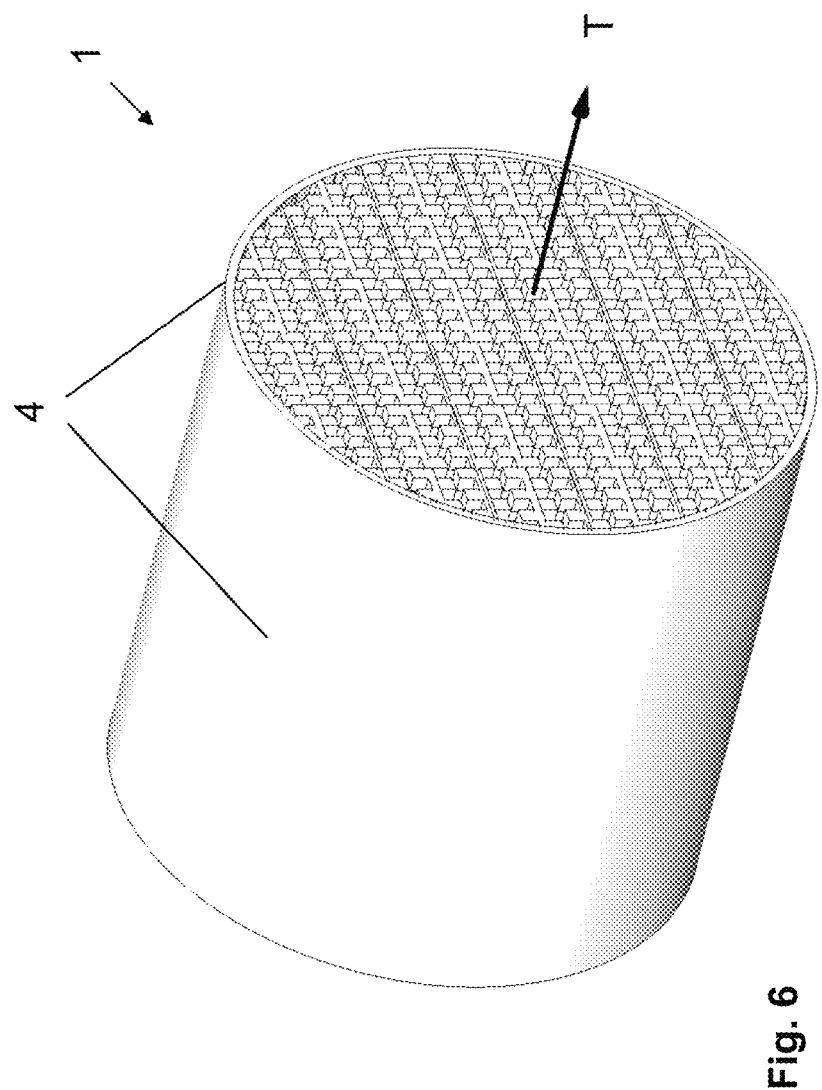
FIG. 6 schematically shows a further embodiment of a molding according to the invention, having a shrouding and a round profile.

A likewise larger block of the 3D-structure having a square footprint and having intersecting, step-shaped webs 2a, 2b, is shown by example in FIG. 5, wherein the layers 3 are aligned so as to be perpendicular to the main flow direction T. In contrast to the preceding examples, the block includes two regions C, D in which the step-shaped webs are differently aligned. The alignment of the webs in these two regions is rotated about the main flow direction T so as to be mutually offset by 90°. On account of this rotation, even better intermixing can be achieved. FIG. 6 shows an example of a larger block of a molding 1, having a round footprint and likewise intersected, step-shaped webs 2d, 2b. The layers aligned so as to be perpendicular to the main flow direction T. The block in its interior may include a plurality of regions in which the step-shaped webs are differently aligned in an analogous manner to FIG. 5, where the alignment of the webs may be rotated about the main flow direction T so as to be mutually offset by 90°. The molding on its circumference is delimited by a shrouding 4. The shrouding 4 in this specific example is an integral component part of the molding 1, that is to say that the molding 1 is configured as one part with the shrouding.

This molding, too, with slight adaptations can be manufactured by the method described above for the molding 1 shown in FIG. 1. The template is designed such that it has the same round cross section as the molding 1, and on the circumference has a recess which corresponds to the shrouding 4. In this manner, the entire molding 1 can be manufactured by one method. The molding 1 which is shown in an exemplary manner in FIG. 4, together with its shrouding, is composed of silicone-carbide ceramics.

Figure 7:
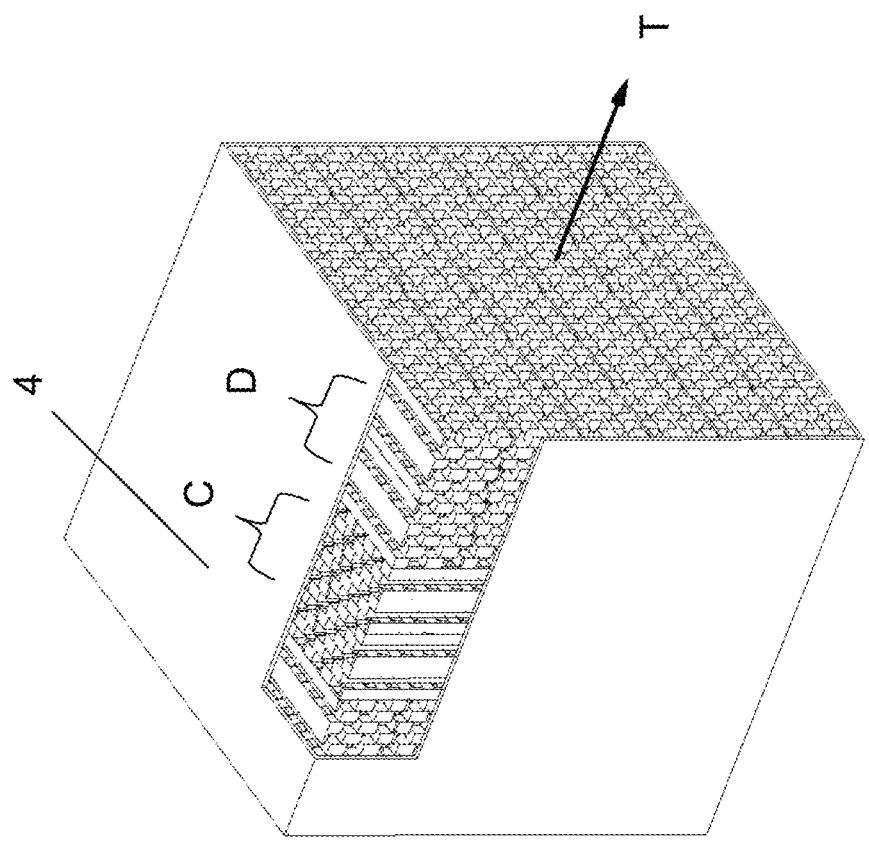
FIG. 7 schematically shows a further embodiment of a molding according to the invention, having a shrouding and a square profile.

A larger molding having a square footprint and intersecting, step-shaped webs is shown by example in FIG. 7. The layers are aligned so as to be perpendicular to the main flow direction T. The block includes a plurality of regions C, D, in which the step-shaped webs are differently aligned. For illustrative purposes, the shrouding 4 of the molding 1 has been cut open and removed at one edge. The alignment of the webs in the two regions C, D, is rotated about the main flow direction T so as to be mutually offset by 90.

Figure 8A:
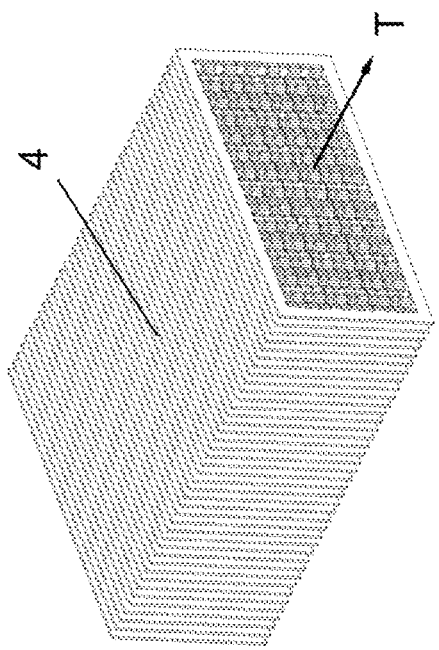
FIG. 8a schematically shows a further embodiment of a molding according to the invention, having a shrouding and fins.
Figure 8B:
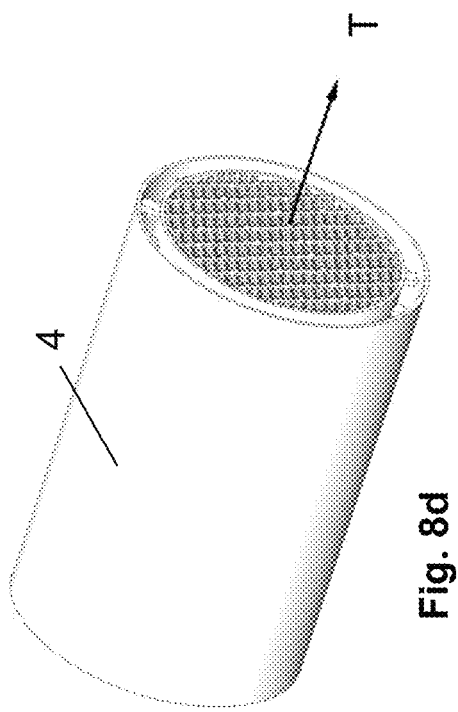
FIG. 8b schematically shows a further embodiment of a molding according to the invention, having a shrouding and rib structures.
Figure 8C:
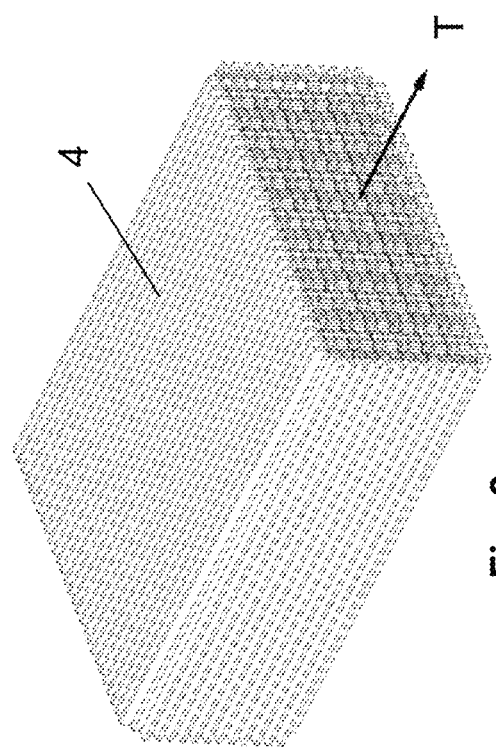
FIG. 8c schematically shows a further embodiment of a molding according to the invention, having a double shrouding and a rectangular profile.
Figure 8D:
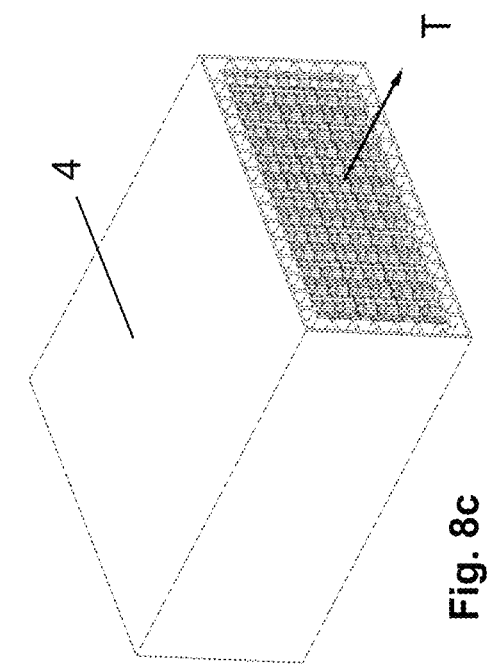
FIG. 8d schematically shows a further embodiment of a molding according to the invention, having a double shrouding and a round profile.

FIGS. 8a, 8b, 8c, 8d show alternative moldings having a rectangular footprint having intersecting, step-shaped webs and layers which are aligned so as to be parallel with the main flow direction T. These embodiments show various structures of the shrouding 4, which in an analogous manner to FIG. 6, are integral component parts of the shrouding 4 and ultimately of the molding. FIG. 8a shows fins which run parallel with the main flow direction T. Such fins are particularly important for heat exchangers for an improved temperature exchange. FIG. 8b shows rib structures on the shrouding 4. FIG. 8c shows a double shrouding 4 which, by means of bracings, forms a cavity shrouding 4. FIG. 8d shows a double shrouding 4 on a molding 1 having a round cross section. The double shrouding 4, in particular, can provide improved insulation of the molding 1.

FIG. 9 shows an example of a molding 1 having a rectangular footprint with intersecting, step-shaped webs and layers which are aligned so as to be perpendicular to the main flow direction 1. The block contains two regions C, D, in which the step-shaped webs are differently aligned, wherein the alignment of the webs in these two regions is rotated about the main flow direction T so as to be mutually offset by 900. A block E having parallel ducts for rectifying the flow is additionally attached to the exit. These ducts may also be manufactured so as to be integral with the molding 1, as described above.

Figure 10:
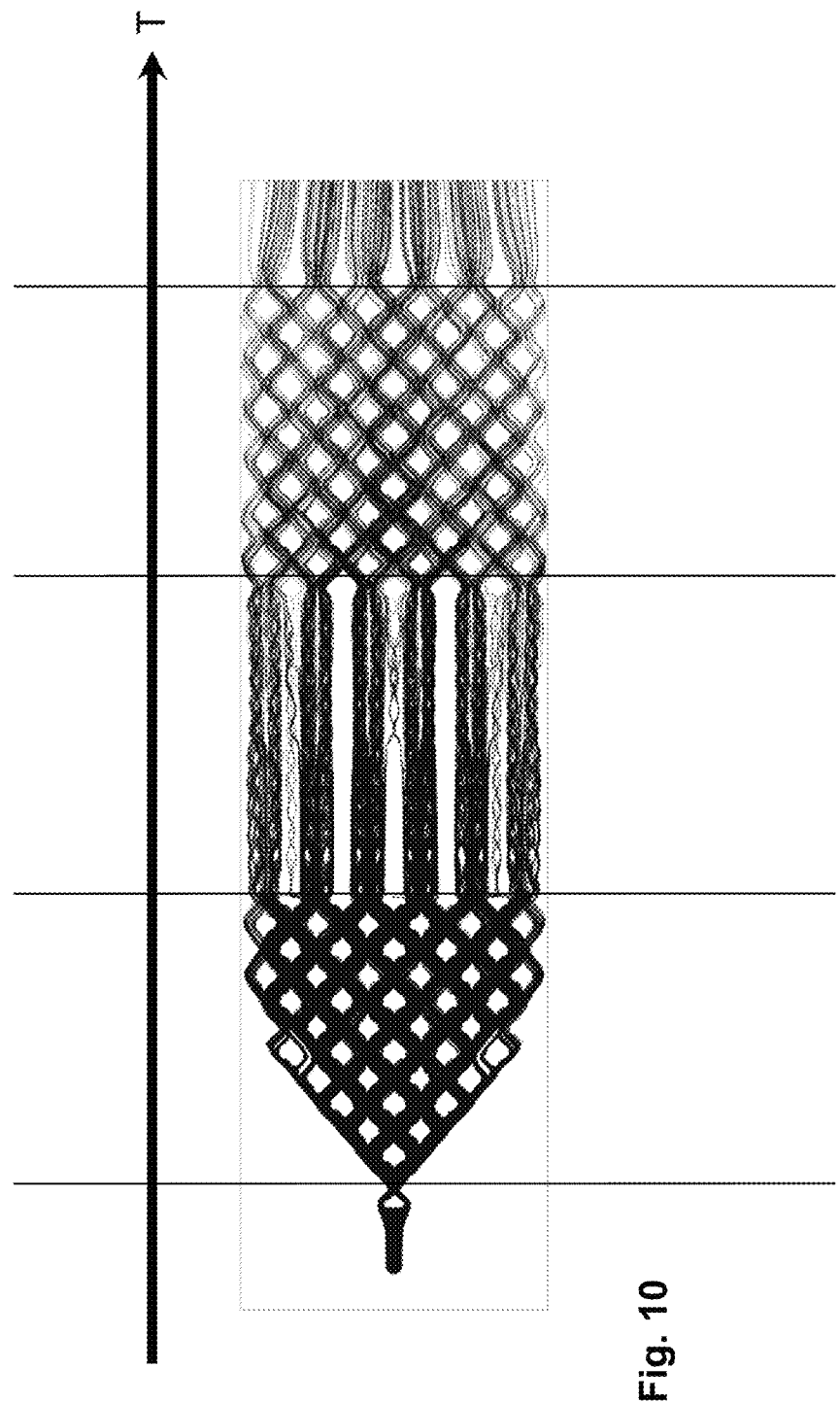
FIG. 10 schematically shows a flow simulation through a 3D-structure according to the invention, and FIG. 11 schematically shows a model sequence of the method according to the invention.

FIG. 10 is an illustration of flow lines in the case of a flow having low Reynolds numbers (laminar conditions) through a molding according to the invention. The flow-passed 3D-structure, that is to say the interior space of the molding, has been omitted in the illustration of the flow lines. The flow lines diverge very rapidly in the plane of the structure in which the step-shaped webs lie, and are distributed across the entire duct cross section, while hardly any dispersion can be identified in the direction which is perpendicular thereto.

In a manufacturing method according to the invention, each layer would thus be applied by means of a template. Here, a plurality of tiers of a plastically deformable compound, in the present case a paste composed of a fine-grained powder (grain size <30 micrometers) of 1.4404 stainless steel, having water and an organic binder consisting of methylcellulose and modest amounts of other components, such as inter alia sodium alkylbenzenesulfonate, ethylene glycol, and polyethylene glycol, may be produced through recesses of a template in order to produce the steps of a first layer 2. Each tier is dried after application thereof. In order to accelerate drying, increased temperatures of, for example, 50° C. and a controlled atmosphere having low air humidity may be used here. Once all tiers of the layer 2 have been applied through the template and dried, the second layer 2' of the plastically deformable compound is applied, again in tiers, using a further template and dried. Once the last layer 2'''' shown in an exemplary manner has been applied, the finished molding is sintered in the furnace. Here, in a first step at a reduced temperature of 500°-600° C. the organic binder is gassed. In the case of typical web dimensions of a few 100 micrometers, this step takes about 0.5 hours. Thereafter, the sintering process per se is performed at temperatures around 1200-1350° C., likewise during about 0.5 hours.

After sintering, the temperature in the furnace is slowly and continually reduced, and the parts are cooled in this manner. The molding thus produced is then composed of sintered stainless steel W-No. 1.4404 (X2CrNiMo17-12-2, austenitic stainless steel).

The produced molding 1 can be subsequently machined, coated, cut, adhesively bonded, or processed in another manner. In the simplest case, the molding is pushed into a sleeve. Such a simple molding 1 may be used as a static mixer, for example.

Figure 11:
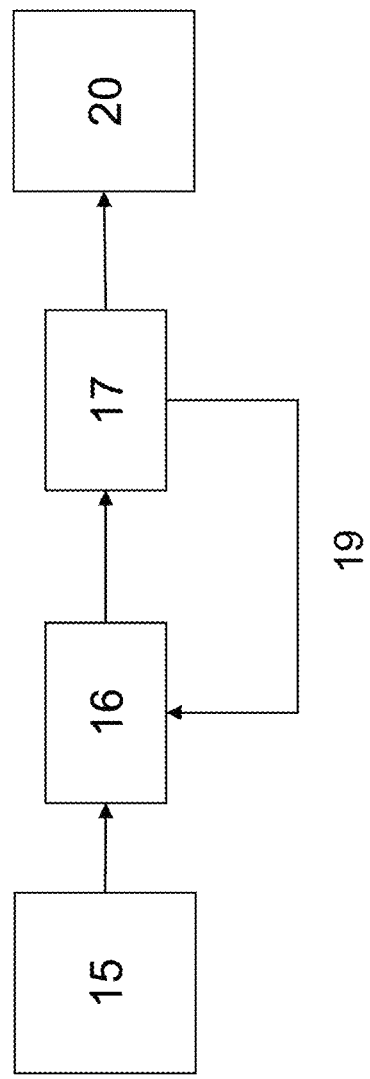

The manufacturing method according to the invention is shown as a model in FIG. 11. First, a template having recesses is provided 15. The recesses of the template establish the spatial dimensions of a first layer to be applied, while the fixed components of the template simultaneously form the later clearances of the individual layers. A first plastically deformable compound is applied through the template 16, such as, for example, the abovementioned paste composed of a fine-grained powder (grain size <30 micrometers) of 1.4404 stainless steel, having water and an organic binder consisting of methylcellulose and modest amounts of other components, such as inter alia sodium alkylbenzenesulfonate, ethylene glycol, and polyethylene glycol. Once the template is removed, a first layer having clearances remains. Using the same template, a further tier having an identical profile could be applied. Using a further template, a further layer having the plastically deformable compound is applied onto the first layer 17. This step may be repeated 17 for as often as there are layers to be applied. In the present example, a dedicated template having a dedicated pattern, that is to say a dedicated configuration of recesses in the template, is used for each layer. Here, the templates are selected to be successive such that the recesses of a following template contact the layer already applied at least on the edges, if not even of up to 50% of the surface onto which the template is placed is overlapped.

Depending on the plastically deformable compound used, a drying or curing step may take place between the individual application steps 16, 17. In the present example solidifying 20 takes place once the desired molding includes all envisaged layers. In addition hereto, sintering takes place as described above.

By way of the method according to the invention it is possible for a complex functional 3D-molding to be created using a comparatively small number of different templates.

Figure 12A:
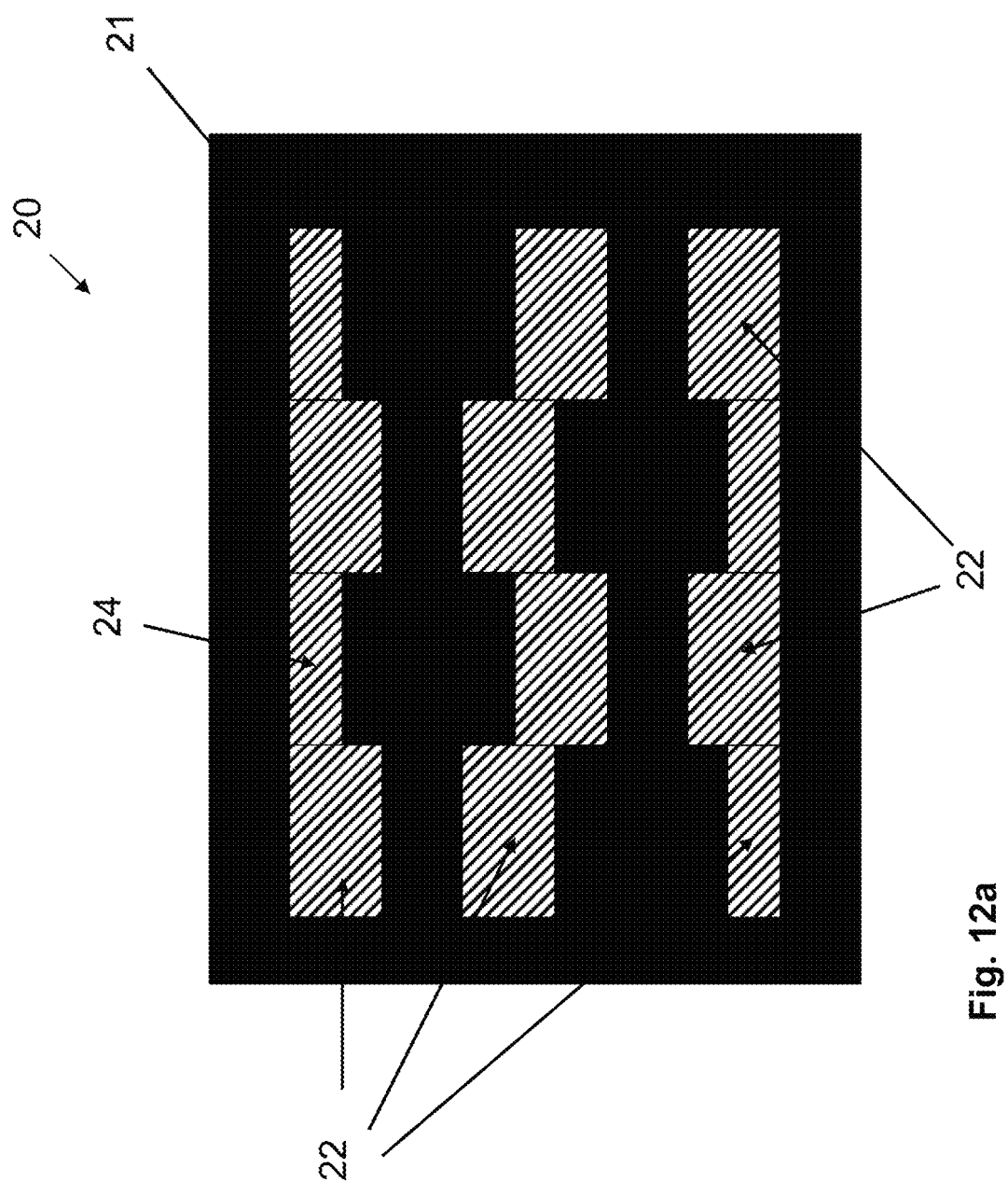
FIG. 12a schematically shows a template such as may be used for carrying out the method according to the invention.

An example of a template 20 as may be used in the method according to the invention is shown in FIG. 12a. This exemplary template 20 may be used for applying the first layer 2 of the molding shown in FIG. 2, for example. The template 20 is composed of stainless steel and comprises a body from which a specific pattern has been milled. In the present case, the template 20 comprises a stainless steel body 21 having recesses 22 which form a pattern corresponding to the pattern of the first layer 2 of the molding 1 shown in FIG. 2. When proceeding from the viewpoint of the observer, the first steps of the molding 1 of FIG. 2 form on the recesses 22 after the plastically deformable material has been applied. Since this is the first layer 2, connecting seams are provided between the individual steps. Said connecting seams are formed by plastically deformable compound which is applied on the template 30 through the further recesses 24. In relation to FIG. 2 and the resulting molding 1, the black region of the stainless steel body 21 forms a clearance of the molding 1. The recesses 22 and the steps produced therewith may have edge lengths of between 10 μm and 10 mm, for example, depending on the envisaged application. In the present exemplary embodiment, the recesses 22 have edge lengths of 100 to 250 μm.

Figure 12B:
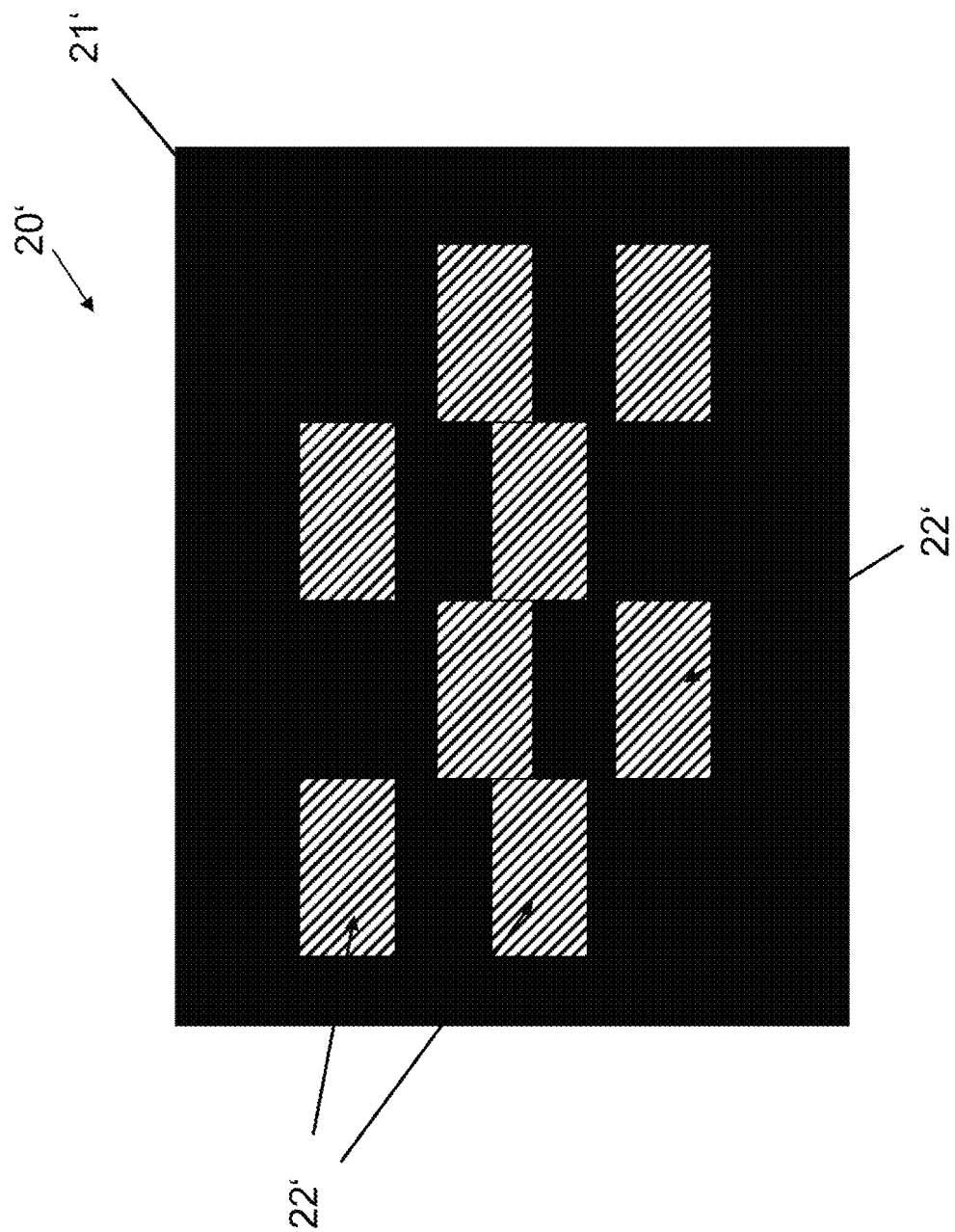

A further template 20' is shown in FIG. 12b. Such a further template 20' may be used for applying a further layer 2' of FIG. 2. The template comprises a stainless steel body 21' into which recesses 22' have been milled. Here, the recesses 22' have been disposed so as to be offset in relation to the recesses 22, namely such that, in an exemplary manner for manufacturing a molding 1 as per FIG. 2, half of the upper side of the already applied step layer 2 remains visible on account of the recesses 22'. In this manner, an overlapping region which forms a mating face between the layers 2 and 2' results. Said plastically deformable compound is applied through the recesses 22'. The stainless steel body 21' is reserved, that is to say that it forms a clearance in the molding 1. The entirety of clearances of the entire molding 1 which have thus been formed in the composite by the stainless steel bodies 21, 21', form an interior volume in the finished molding 1. The templates 20, 20', and the arrangements of the recesses are selected such that an interior volume which is designed so as to be contiguous and in complete fluid communication is created. Such an interior volume would be flow-passable by a fluid without dead zones and would be utilizable as a static mixer, for example.

The invention claimed is:

1. A molding which is flow-passable by a fluid in at least one flow direction, the molding extending in three axes, comprising:
    a) a multiplicity of mutually parallel successive layers, wherein the individual layers are formed in a planar extent which is formed from two of the axes of extent and a fraction of the entire extent in the third axis of extent, the fraction of the entire extend forms a thickness of the respective layer, and each layer includes at least one clearance, and wherein
    b) each layer includes at least one mating face toward a following or preceding layer, wherein the at least one mating face exists when there is at least physical contact between the respective layer and the following or preceding respective layer, and wherein
    c) each clearance of one layer overlaps at least one region of the clearance of the following or preceding layer, such that
    d) the layers collectively configure step-shaped webs in the molding,
    wherein the molding comprises at least two such webs.

2. A molding for use in a thermally conductive structure, the molding extending in three axes comprising
    a) a multiplicity of mutually parallel successive layers, wherein the individual layers are formed in a planar extent which is formed from two of the axes of extent and a fraction of the entire extent in the third axis of extent, the fraction of the entire extent forms a thickness of the respective layer, and each layer includes at least one clearance, and wherein
    b) each layer includes at least one mating face toward a following or preceding layer, wherein the at least one mating face exists when there is at least physical contact between the respective layer and the following or preceding respective layer, wherein, when considering that a physical contact may range from only contact on the edge side up to a material overlap, the present at least one physical contact between the respective layer and the following or preceding respective layer is a material overlap, and wherein
    c) each clearance of a layer overlaps at least one region of the clearance of the following or preceding layer, such that
    d) the layers collectively configure step-shaped webs in the molding, and the molding comprises at least two such webs,
    wherein the molding comprises a phase-change material.

3. A molding which is flow-passable by a fluid in at least one flow direction, the molding extending in three axes, comprising:
    a) a multiplicity of mutually parallel successive layers, wherein the individual layers are formed in a planar extent which is formed from two of the axes of extent and a fraction of the entire extent in the third axis of extent, wherein the fraction of the entire extent forms a thickness of the respective layer, and wherein each layer includes at least one clearance, and wherein
    b) each layer includes at least one mating face toward a following or preceding layer, wherein the at least one mating face exists when there is at least physical contact between the respective layer and the following or preceding respective layer, wherein, when considering that a physical contact may range from only contact on the edge side up to a material overlap, the present at least one physical contact between the respective layer and the following or preceding respective layer is a material overlap, and wherein
    c) each clearance of one layer overlaps at least one region of the clearance of the following or preceding layer, such that
    d) the layers collectively configure step-shaped webs in the molding,
    wherein the molding comprises at least two such webs.

4. The molding as claimed in claim 3, wherein the at least two webs in the molding are designed in such a manner that they mutually intersect.

5. The molding as claimed in claim 3, wherein the molding includes a shrouding which runs parallel with the at least one flow direction, and the entire molding is preferably configured as one part.

6. The molding as claimed in claim 5, wherein the shrouding includes recesses and/or fins and/or ribs.

7. The molding as claimed in claim 3, wherein the entirety of the clearances of the molding configure a flow-passable interior volume of the molding.

8. The molding as claimed in claim 3, wherein the molding includes between 2 and 50 layers.

9. The molding as claimed in claim 3, wherein the webs are designed such that they are intersected at a substantially right angle in relation to one another.

10. The molding as claimed in claim 3, wherein the layers run parallel with the at least one flow direction, or wherein the layers run orthogonally to the at least one flow direction.

11. A use of a molding as claimed in claim 3 as a static mixer, or as a heat exchanger, or for emulsifying or for foaming or for performing catalyzed chemical reactions, or for decontaminating or for vaporizing or for condensing or for exchanging mass between fluid flows.

12. The molding as claimed in claim 11, wherein the molding is encapsulated by a membrane such that the phase-change material is stored in the molding in a fluid-tight manner.

13. The molding as claimed in claim 11, wherein the molding is composed of a material having a thermal conductivity of at least 20 W/(mK), preferably 100 W/(mK).

14. A composite molding, comprising a plurality of moldings as claimed in claim 3.

15. The molding as claimed in claim 3, wherein each layer is to be understood as a group of bodies in the same planar extent through the molding, wherein a successive layer is also to be understood as a layer which is in physical contact with said planar extent and which lies parallel therewith.

16. The molding as claimed in claim 3, wherein a first layer is followed by a second layer which is disposed so as to be offset in such a manner in relation to the first layer that a surface of the first layer coming into contact with the second layer is overlapping the latter or the second layer is disposed such that the second layer has at least one common edge with the first layer.

17. The molding as claimed in claim 3, wherein with respect to the at least one physical contact between the respective layer and the following or preceding respective layer being a material overlap, a proportion of the overlap in terms of surface area is between 5% to 95% of mutually facing layer surfaces.

* * * * *